(12) United States Patent
Dolinski et al.

(10) Patent No.: US 11,098,903 B2
(45) Date of Patent: Aug. 24, 2021

(54) BEZEL COUPLING SYSTEM WITH BETTER ALIGNMENT TO KNOBS APPLIED FOR COOKING PRODUCTS

(71) Applicant: WHIRLPOOL CORPORATION, Benton Harbor, MI (US)

(72) Inventors: Diego D. Dolinski, Joinville (BR); Guilherme Nehring, Joinville (BR); Eduardo Sant'Anna Martins, Joinville (BR)

(73) Assignee: Whirlpool Corporation, Benton Harbor, MI (US)

( * ) Notice: Subject to any disclaimer, the term of this patent is extended or adjusted under 35 U.S.C. 154(b) by 64 days.

(21) Appl. No.: 16/213,519

(22) Filed: Dec. 7, 2018

(65) Prior Publication Data

US 2019/0178499 A1 Jun. 13, 2019

(30) Foreign Application Priority Data

Dec. 11, 2017 (BR) ...................... 10 2017 026633 8

(51) Int. Cl.
  *F24C 3/12* (2006.01)
  *B23P 19/04* (2006.01)
  *G05G 1/08* (2006.01)

(52) U.S. Cl.
  CPC .............. *F24C 3/124* (2013.01); *B23P 19/04* (2013.01); *F24C 3/126* (2013.01); *G05G 1/08* (2013.01)

(58) Field of Classification Search
  CPC ........... F23C 3/124; F24C 7/082; B23P 19/04
  See application file for complete search history.

(56) References Cited

U.S. PATENT DOCUMENTS

| | | | |
|---|---|---|---|
| 8,733,204 B2 | 5/2014 | Voss et al. | |
| 9,127,846 B2 | 9/2015 | Bollman et al. | |
| 2003/0221498 A1 | 12/2003 | Mere et al. | |
| 2006/0254573 A1 | 11/2006 | Steinman et al. | |
| 2016/0097541 A1* | 4/2016 | Moonho | G05G 1/08 |
| | | | 126/39 E |
| 2016/0265786 A1* | 9/2016 | Choi | F24C 3/124 |
| 2016/0329175 A1 | 11/2016 | Bowen | |
| 2017/0191671 A1 | 7/2017 | Chambers et al. | |

FOREIGN PATENT DOCUMENTS

| | | | | |
|---|---|---|---|---|
| CN | 106580119 A | * | 4/2017 | ............. F24C 7/082 |
| CN | 106580119 A | | 4/2017 | |
| DE | 10249671 A1 | | 5/2003 | |
| EP | 2436828 A1 | | 4/2012 | |
| WO | 2009083393 A1 | | 7/2009 | |

OTHER PUBLICATIONS

CN-106580119-A Translation.*

* cited by examiner

*Primary Examiner* — Steven B McAllister
*Assistant Examiner* — Aaron H Heyamoto
(74) *Attorney, Agent, or Firm* — Price Heneveld LLP

(57) ABSTRACT

Aspects of the present disclosure relate to the technological field of cooking devices, and more particularly to a cooking device that includes a surface having an opening and a gas flow control valve including a rod that extends through the opening of the surface. A knob may be arrayed on the surface to cooperate with the rod. A frame-plate may be arrayed between the knob and the surface. The frame-plate includes a central orifice that allows passage of the rod there through and is rotatable around the rod to align the frame-plate relative to the surface.

14 Claims, 3 Drawing Sheets

BEZEL COUPLING SYSTEM WITH BETTER ALIGNMENT TO KNOBS APPLIED FOR COOKING PRODUCTS

CROSS-REFERENCE TO FOREIGN PRIORITY DOCUMENT

The present application claims the benefit under 35 U.S.C. §§ 119(b), 119(e), 120, 121, 365(c), and/or 386(c) of Brazilian Patent Application No. BR 10 2017 026633 8, filed Dec. 11, 2017, entitled "Cooking Device," the contents of which are incorporated herein by reference in their entirety.

FIELD OF THE DISCLOSURE

This disclosure relates to a cooking device equipped with a surface provided with burner control knobs. The burner control knobs are provided with frame-plates shaped in a manner that allows easy alignment and assembly.

BACKGROUND

As is commonly known in the art, home cooking devices, particularly regular stoves and cooktop devices, are provided with burners connected to gas flow control valves that allow a user to control the flames in the burners.

The cooking devices are also provided with structures offering services that may be a hot panel or cooktop, comprising knobs that interact with the gas flow control valves, generally in a rotational manner, thus ensuring easier interaction with the user.

The knobs are usually provided with frame-plates arrayed between the actual knob and the hot panel or cooktop of the device for aesthetic purposes, particularly to cover any gaps between the knob and the actual structure of the hot panel or cooktop. In order to comply fully with their aesthetic purpose, it is desirable that frame-plates are assembled in a manner whereby they are aligned with the knobs, which may be challenging on a large scale.

Several solutions have been proposed in the art in order to ensure a well-aligned assembly of the frame-plates, many of which require the use of an assembly mold, or more commonly, screwing the frame-plates into place, which hampers large-scale assembly.

An example of this type of solution may be found in patent application US2017/0191671 A1, which discloses a construction of a knob provided with a frame-plate, wherein the frame-plate is attached by screws (see Paragraph [0033] of document US2017/0191671 A1).

It is thus noted that the current state of the art does not offer a practical solution for assembling frame-plates between the knobs and the hot panels or cooktops on cooking devices, particularly ensuring a well-aligned assembly.

SUMMARY

Aspects of the present disclosure relate to a cooking device that includes at least one burner, a structure including a surface having an opening, and a gas flow valve configured to control a flow of gas to the at least one burner. The gas flow valve can include a rod extending through the opening in the surface. A knob is arrayed on the surface and can be configured to cooperate with the rod to control the flow of gas to the at least one burner. A frame-plate is disposed between the knob and the surface and includes a central orifice configured to allow passage of the rod through the frame-plate. The frame-plate is configured to be slotted through the opening and is rotatable about the rod to align the frame-plate relative to the surface.

According to another aspect of the present disclosure, a method of mounting a frame-plate to a surface of a cooking device is provided. The method includes providing a cooking device have at least one burner and a gas flow valve including a rod extending through an opening the surface. A frame-plate having a central orifice and at least one protuberance is provided, the method further including passing the rod through the central orifice of the frame-plate. The at least one protuberance is slotted through the opening in the surface. The frame-plate can be rotated about the rod to engage the at least one protuberance with a first contact of region of the surface such that the frame-plate is assembled relative to the surface through an interference fit.

According to one aspect of the present disclosure, a frame-plate for mounting a knob to a surface of a cooking device is provided. The cooking device includes at least one burner and a gas flow valve, the gas flow valve including a rod that cooperates with the knob to control the at least one burner. The frame-plate includes a central orifice that is configured to allow passage of the rod through the frame-plate, with the frame-plate being rotatable about the rod. The frame-plate also includes at least one protuberance configured to be slotted through a corresponding opening provided in the surface and to engage a first contact region of the surface through an interference fit when the frame-plate is rotated about the rod. The frame-plate further includes at least one geometry configured to engage a second contact region of the surface through a snap-fit connection when the frame-plate is rotated about the rod.

BRIEF DESCRIPTION OF THE DRAWINGS

Aspects of the present disclosure are described in detail, based on the listed Figures, which are merely exemplary rather than limiting, as adaptations and modifications may be introduced without moving beyond the scope of the claimed protection.

In the Drawings.

DETAILED DESCRIPTION

Figure 1:
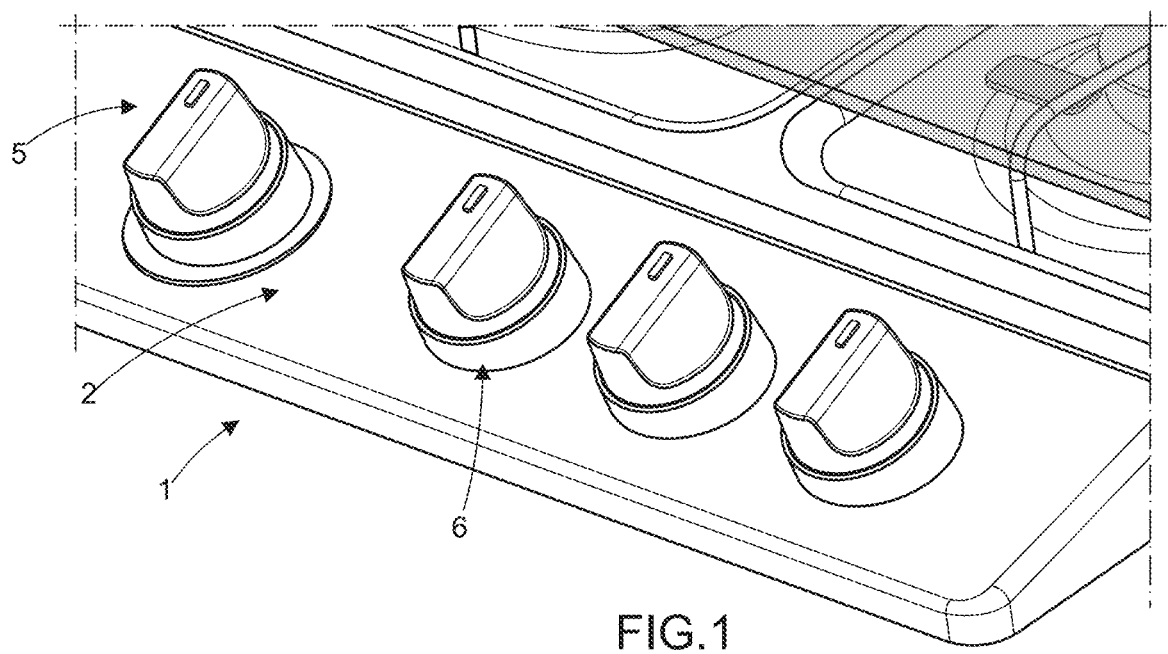
FIG. 1 is a front perspective view of a cooking device according to an aspect of the present disclosure.
Figure 2:
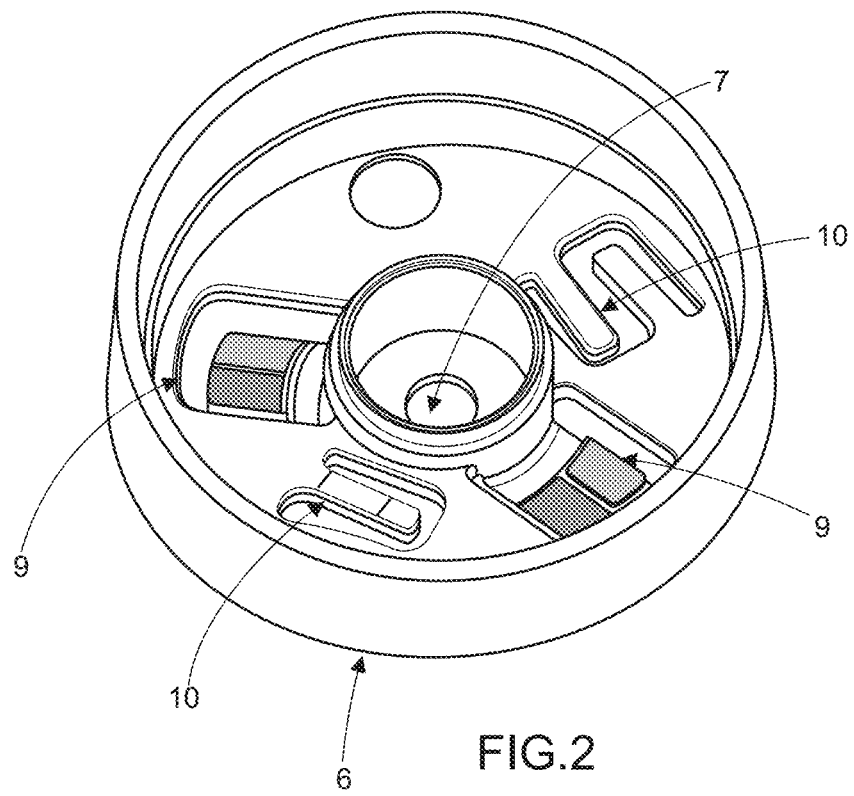
FIG. 2 is a top front perspective view of a frame-plate according to an aspect of the present disclosure.
Figure 3:
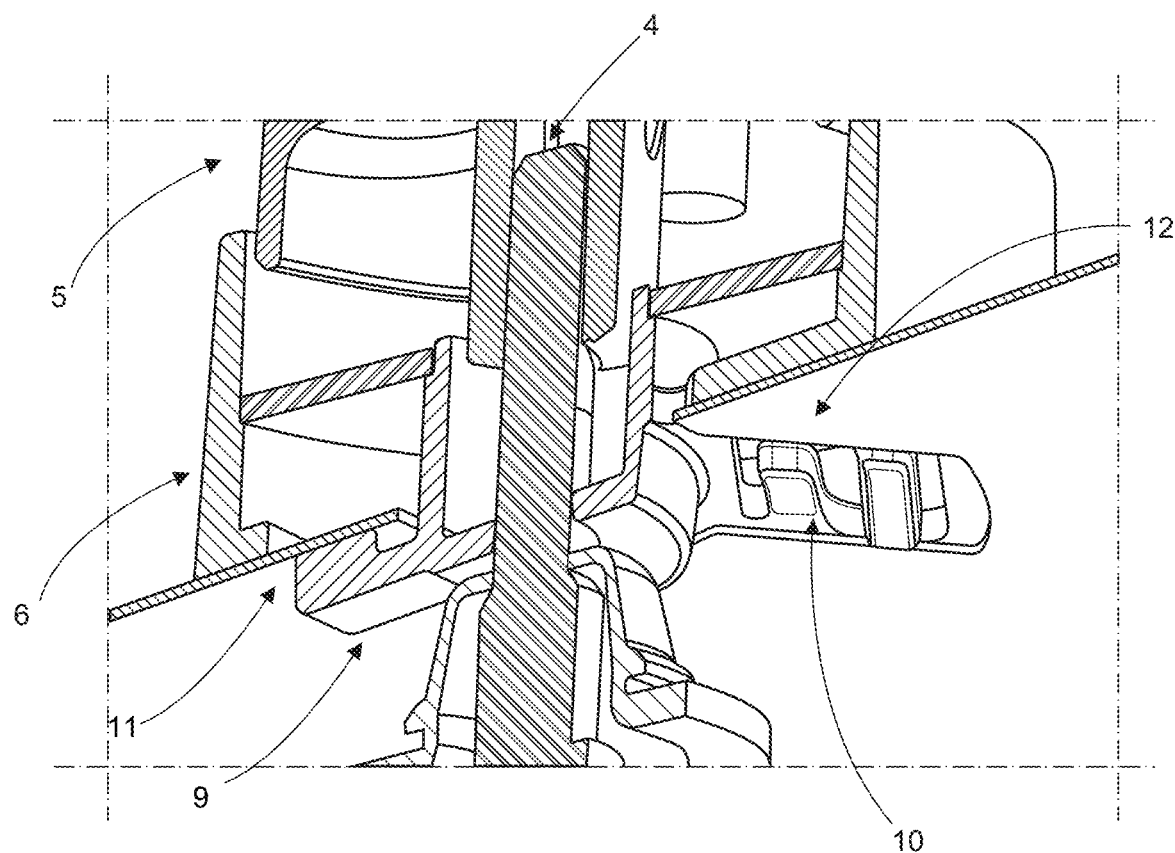
FIG. 3 is a cross-section of a frame-plate according to an aspect of the present disclosure.
Figure 4:
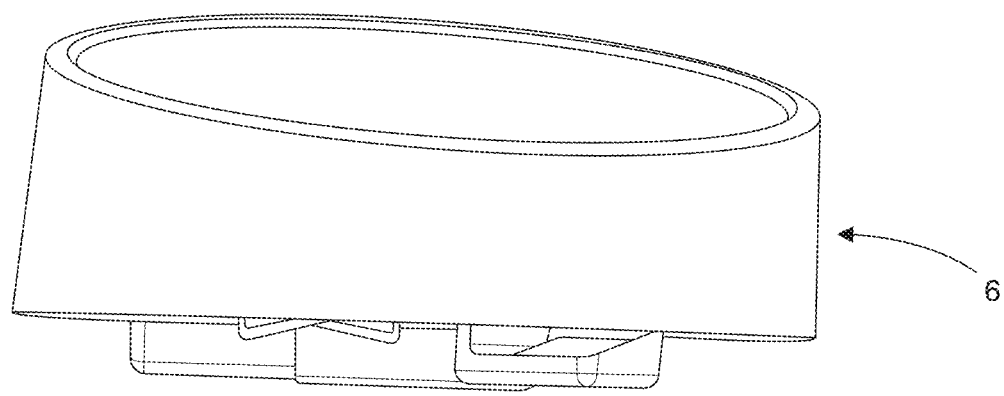
FIG. 4 is a side perspective view of a frame-plate according to an aspect of the present disclosure.
Figure 5:
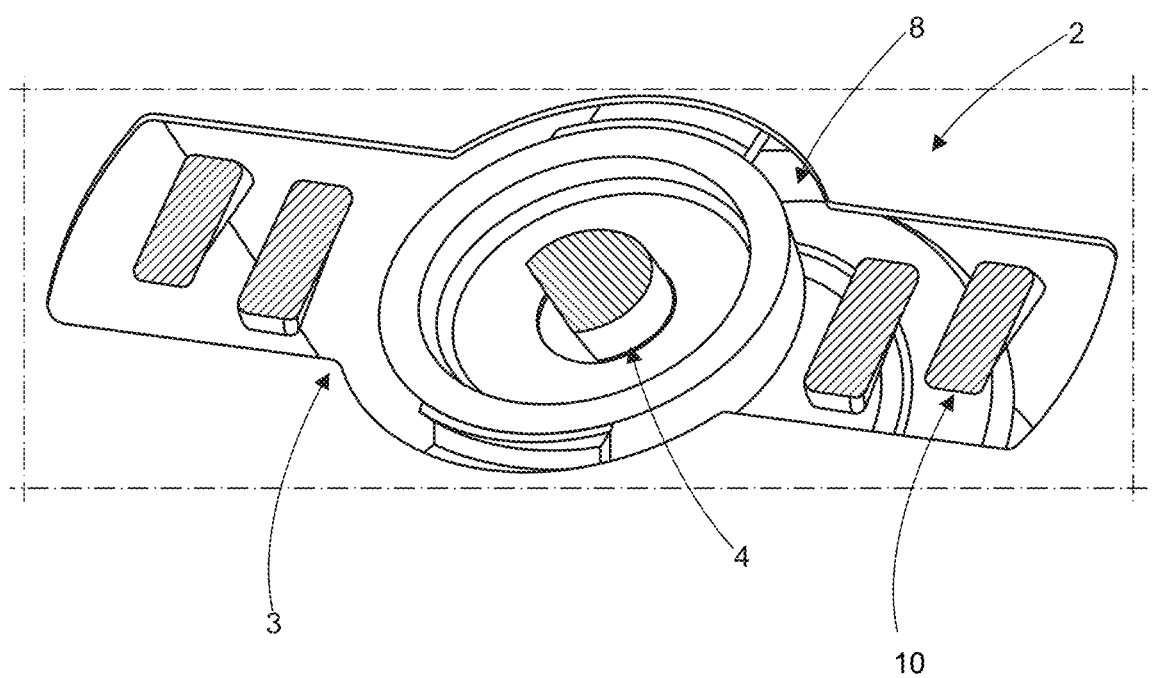
FIG. 5 is a cross-section of a cooking device, which holds the frame-plate and the knob according to an aspect of the present disclosure.

As referenced in FIGS. 1-5, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations and step sequences, except where expressly specified to the contrary. It is also to be understood that the specific devices and processes illustrated in the attached drawings, and described in the following specification, are simply exemplary aspects of the concepts defined in the appended claims. Hence, specific dimensions and other physical characteristics relating to the aspects disclosed herein are not to be considered as limiting, unless the claims expressly state otherwise. The drawings referenced herein are schematic and associated views thereof are not necessarily drawn to scale.

Aspects of the present disclosure relate to assembling the frame-plates in an aligned manner between the knobs and the hot panels or cooktops on cooking devices. Aspects of the present disclosure relate to providing a cooking device whose components allow aligned assembly of the frame-plates between the knobs and the hot panels or cooktops, particularly on a large scale.

As illustrated in FIGS. 1-5, the present disclosure refers to a cooking device equipped with a specific construct that allows aligned assembly of the frame-plates between the knobs and the hot panels or cooktops on cooking devices, particularly on a large scale.

To do so, the cooking device of the present disclosure comprises a structure 1 provided with a surface 2 that comprises at least one opening 3 (shown in FIG. 5), corresponding to the ideal positioning for each knob 5.

The structure 1 provided with a surface 2 may be either a hot panel or the actual cooktop of the cooking device.

The cooking device includes at least one gas flow control valve, which allows the user to control flames in burners of the cooking device.

Each gas flow control valve comprises a rod 4 that extends through the opening 3 of the surface 2. The rod 4 works in cooperation with the knob 5 arrayed on the surface 2, whereby it allows interaction between a user and a desired burner flame control.

The cooking device also includes a frame-plate 6, also referred to as a bezel, arrayed between the knob 5 and the surface 2, whereby it completely covers the openings 3 in the surface 2 and provides an aesthetic benefit for the cooking device.

The frame-plate 6 includes a central orifice 7 that allows the passage of the rod 4 of the gas flow control valve, being particularly rotatable around the rod 4 and slotting through interference onto the structure 1 provided with the surface 2. The central orifice 7 can fit tightly around the rod 4, whereby there is little space for misalignment.

The cooking device includes a separation gap 8 between the frame-plate 6 and the structure 1 provided with the surface 2, that can offset any misalignment between the rod 4 and the opening 3 on the surface 2.

Slotting into place through an interference fit is materialized particularly through interaction between protuberances 9 on the actual structure of the frame-plate 6, and a first contact region 11 of the structure 1 provided with the surface 2.

The frame-plate 6 also includes at least one geometry 10, that can have an S-shape, that interacts with a second contact region 12 of the structure 1 provided with the surface 2. This interaction ensures a tight snap-fit connection, as indicated by audible feedback such as a "click" that prevents the displacement or even the removal of the frame-plate 6 by the user after assembly.

The assembly described above and illustrated in the Figures allows the frame-plate 6 to be easily assembled, slotted, and rotated into its ideal position on the surface 2 of the cooking device. As a result, the correct alignment of the frame-plate 6 is obtained quickly, avoiding the use of additional means of attachment, such as screws or other fasteners as known in the art. There is also no need for an assembly mold during the fabrication of the device, as required by prior constructions known in the art.

Moreover, slotting into place through an interference fit between the frame-plate 6 and the structure 1 provided with the surface 2 prevents easy removal by the end-user, thus avoiding future misalignments.

The following clauses define additional, aspects that are encompassed by the present disclosure:

In one aspect, a method of mounting a frame-plate to a surface of a cooking device is provided, the method including: providing said cooking device having at least one burner and a gas flow valve, said gas flow valve including a rod extending through an opening in said surface, providing said frame-plate having a central orifice and at least one protuberance, passing the rod through the central orifice of the frame-plate, slotting the at least one protuberance through the opening in said surface, and rotating the frame-plate about the rod to engage the at least one protuberance with a first contact region of said surface, wherein rotation of said frame-plate about the rod assembles said frame-plate relative to said surface through an interference fit.

Additional aspects of the method of mounting a frame-plate to a surface of a cooking which can be used alone or in combination with one or more of the other aspects include: rotating said frame-plate about the rod and engaging a second contact region of said surface through a snap-fit connection; providing said frame-plate with at least one geometry configured to engage the second contact region of said surface through a snap-fit connection; rotating said frame-plate about the rod until audible feedback such as a "click" is produced; providing said structure including said surface, wherein said structure is one of a hot panel or a cooktop; and/or placing a knob on the rod with said frame-plate arrayed between the knob and said surface and configuring the knob to cooperate with the rod to control the at least one burner.

In another aspect, a frame-plate is provided for mounting a knob to a surface of a cooking device, the cooking device including at least one burner and a gas flow valve, the gas flow valve including a rod that cooperates with the knob to control the at least one burner, the frame plate comprising: a central orifice configured to allow passage of the rod through the frame-plate, wherein the frame plate is rotatable about the rod, at least one protuberance configured to be slotted through a corresponding opening provided in said surface and to engage a first contact region of said surface through an interference fit when said frame-plate is rotated about the rod, and at least one geometry configured to engage a second contact region of said surface through a snap-fit connection when said frame-plate is rotated about the rod.

Additional aspects of the frame-plate which can be used alone or in combination with one or more of the other aspects include: the at least one geometry can be configured to provide audible feedback such as a "click" to indicate when the at least one geometry engages the second contact region of said surface; said frame-plate includes a pair of protuberances and a pair of geometries; the at least one geometry prevents at least one of a removal and displacement of said frame-plate by a user when the at least one geometry engages the second contact region of said surface; and/or the at least one geometry includes an S-shape.

It is important to stress that the above description is intended only to provide exemplary aspects of the present disclosure. It will be understood that construction-related modifications, variations, and combinations of elements that perform the same function, substantially in the same manner, in order to attain the same results, remain within the protection demarcated by the appended Claims.

It will be understood by one having ordinary skill in the art that construction of the described present disclosure and other components is not limited to any specific material. Other exemplary aspects of the disclosure disclosed herein may be formed from a wide variety of materials, unless described otherwise herein.

For purposes of this disclosure, the term "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary aspects is illustrative only. Although only a few aspects of the present disclosure have been described in detail in this disclosure, those skilled in the art who review this disclosure will readily appreciate that many modifications are possible, e.g., variations in sizes, dimensions, structures, shapes and proportions of the various elements, values of parameters, mounting arrangements, use of materials, colors, orientations, etc. without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure and method without departing from the concepts of the present disclosure, and further it is to be understood that such concepts are intended to be covered by the following claims unless these claims by their language expressly state otherwise.

The invention claimed is:

1. A frame-plate for mounting a knob to a surface of a cooking device, the cooking device comprising at least one burner and a gas flow valve, the gas flow valve including a rod that cooperates with the knob to control the at least one burner, the frame-plate comprising:
    a bottom surface surrounded by an outer wall;
    a central orifice configured to allow passage of a rod of a gas flow valve through said frame-plate, wherein said frame-plate is configured to rotate about the rod;
    at least one protuberance extending from the bottom surface, wherein the at least one protuberance is configured to be slotted through a corresponding opening provided in a surface of a cooking device and is configured to engage a first contact region on a rear side of said surface through an interference fit when said frame-plate is rotated about the rod; and
    at least one geometry formed within the bottom surface of the frame-plate and configured to extend below the bottom surface, wherein the at least one geometry is configured to engage a second contact region on a rear side of said surface through a snap-fit connection when said frame-plate is rotated about the rod, and
    wherein the frame-plate is configured to completely cover the opening in said surface when the frame-plate is mounted on the cooking device.

2. The frame-plate of claim 1, wherein the at least one geometry is configured to provide audible feedback to indicate when the at least one geometry engages the second contact region of said surface.

3. The frame-plate of claim 1, wherein the at least one protuberance comprises a pair of protuberances and the at least one geometry comprises a pair of geometries.

4. The frame-plate of claim 1, wherein the at least one geometry prevents at least one of removal and displacement of said frame-plate by a user when the at least one geometry engages the second contact region of said surface.

5. The cooking device of claim 1, further comprising:
    a gap defined between the frame-plate and the surface.

6. The cooking device of claim 1, wherein the at least one protuberance comprises two protuberances configured to pass through the opening in the surface and engage the first contact region of the surface upon rotation of the frame-plate about the rod to align the frame-plate relative to the surface.

7. The cooking device of claim 1, wherein the at least one geometry comprises two geometries configured to engage the second contact region of the surface through a snap-fit connection upon rotation of the frame-plate about the rod.

8. The cooking device of claim 1, wherein the at least one geometry comprises an S-shape.

9. The cooking device of claim 8, wherein the at least one geometry is configured to provide audible feedback to indicate when the at least one geometry engages the second contact region of the surface.

10. A method of mounting a frame-plate to a surface of a cooking device, the method comprising:
    providing said cooking device having at least one burner and a gas flow valve, said gas flow valve including a rod extending through an opening in said surface;
    providing said frame-plate on a front side of the surface, the frame-plate having a bottom surface surrounded by an outer wall, a central orifice, at least one protuberance extending below the bottom surface, and at least one geometry formed within the bottom surface;
    passing the rod through the central orifice of said frame-plate;

slotting the at least one protuberance through the opening in said surface; and rotating said frame-plate about the rod to engage the at least one protuberance with a first contact region on a rear side of the surface and to engage the at least one geometry with a second contact region of said surface, wherein rotation of said frame-plate about the rod assembles said frame-plate relative to said first contact region through an interference fit and relative to the second contact region through a snap-fit connection, and wherein the frame-plate is configured to completely cover the opening in the surface.

11. The method of claim 10, further comprising:

providing said frame-plate with two geometries formed within the bottom surface and configured to engage the second contact region of said surface through a snap-fit connection.

12. The method of claim 10, further comprising:

rotating said frame-plate about the rod until audible feedback is produced.

13. The method of claim 10, further comprising:

providing said cooking device including said surface, wherein said cooking device is one of a hot panel or a cooktop.

14. The method of claim 10, further comprising:

placing a knob on the rod with said frame-plate arrayed between the knob and a front side of said surface, wherein the knob is configured to cooperate with the rod to control the at least one burner.

* * * * *